INVENTOR
RALPH S. DAMON

Aug. 23, 1966 R. S. DAMON 3,267,929
HEATING APPARATUS
Filed Feb. 16, 1965 9 Sheets-Sheet 2

INVENTOR
RALPH S. DAMON
BY
Bosworth, Sessions,
Herrstrom & Knowles
ATTORNEYS.

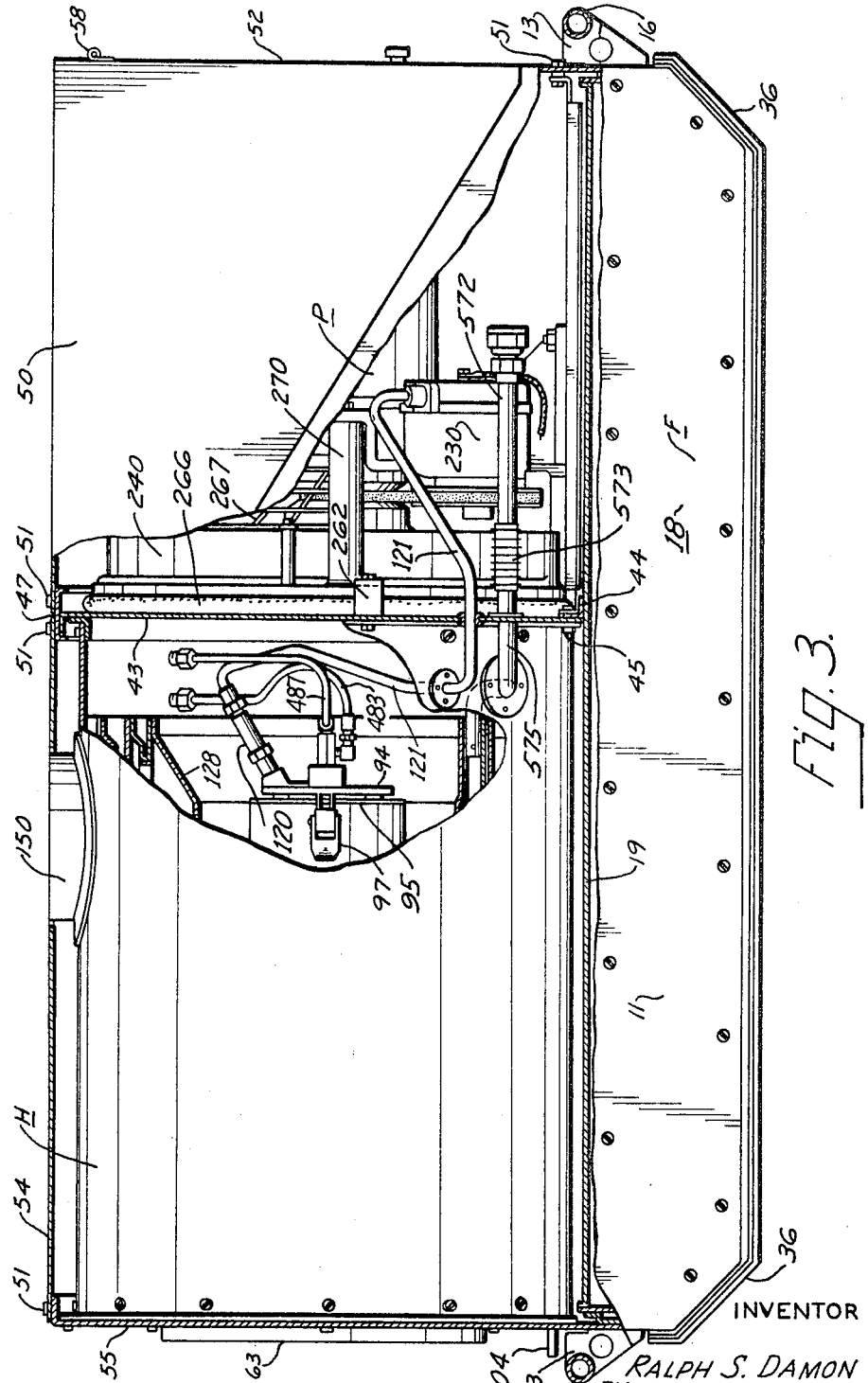

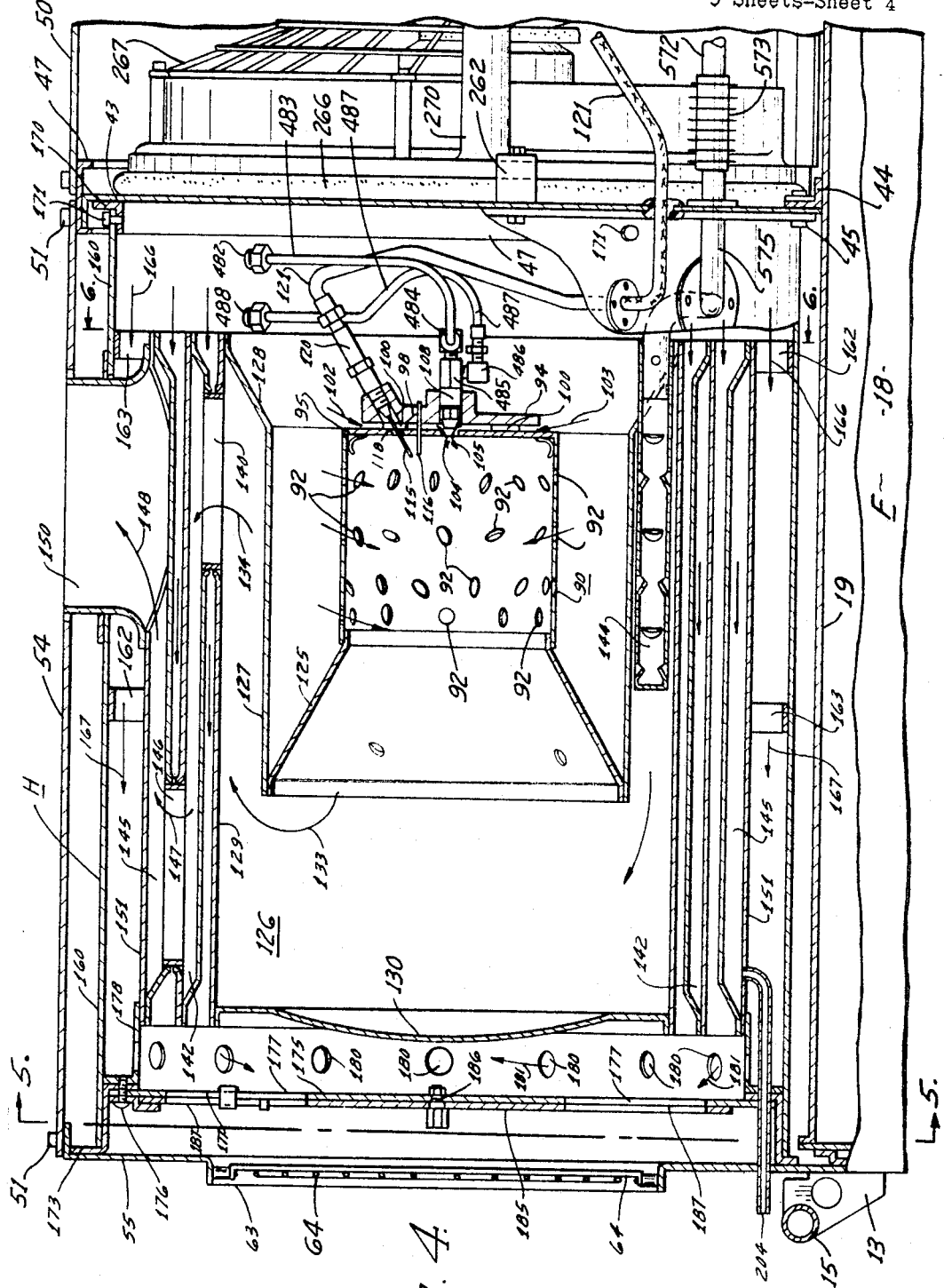

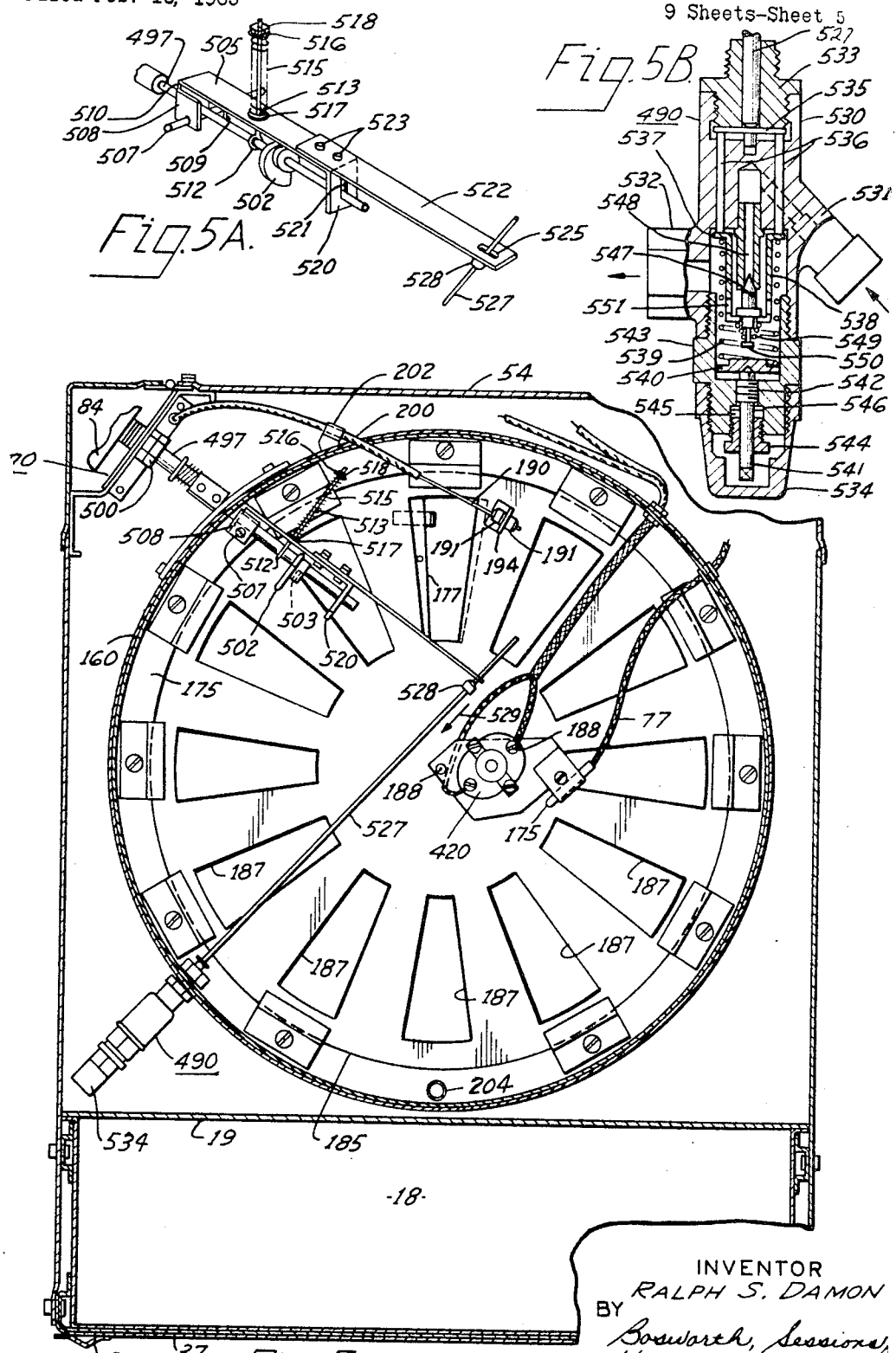

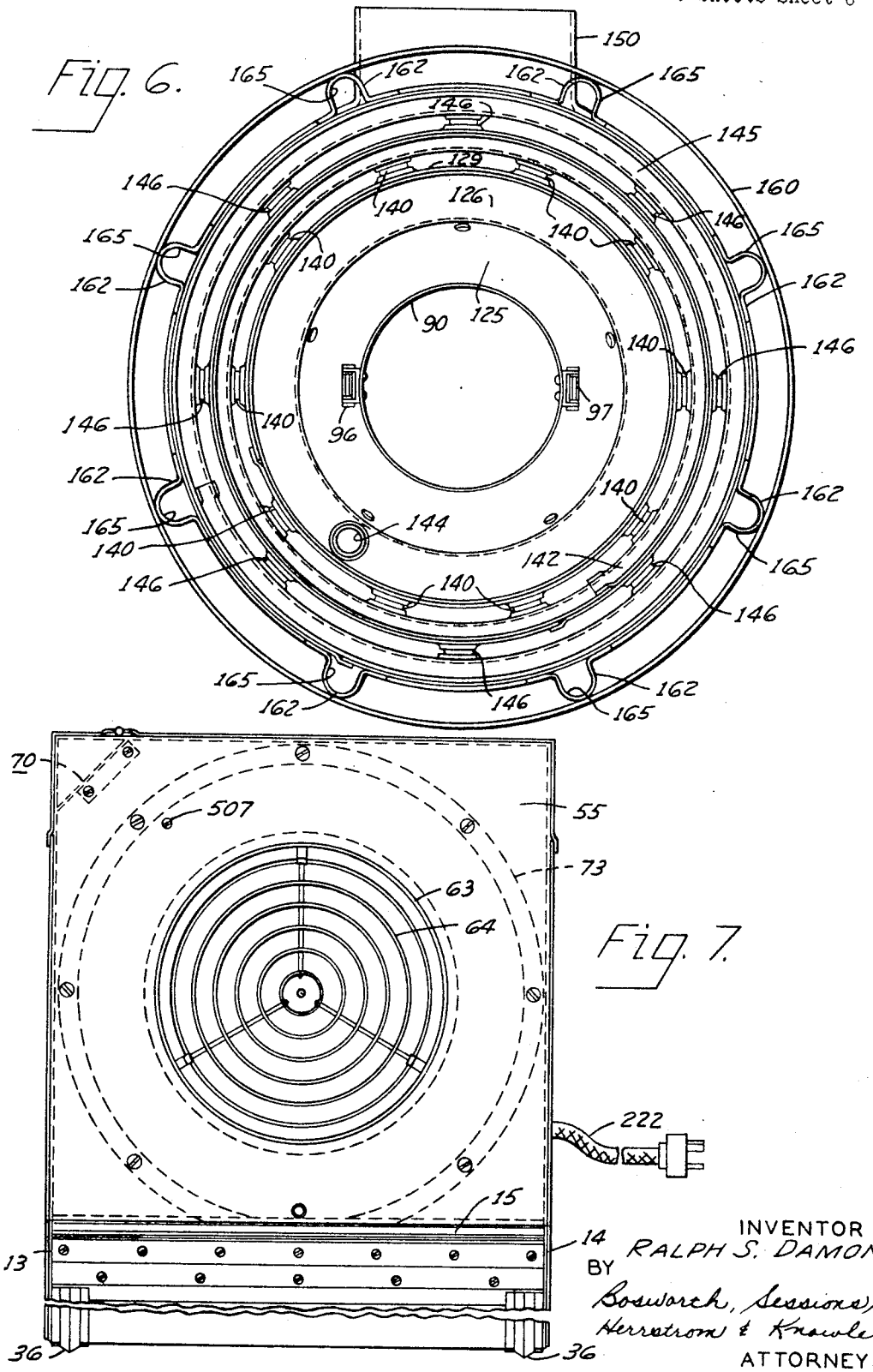

Aug. 23, 1966     R. S. DAMON     3,267,929
HEATING APPARATUS
Filed Feb. 16, 1965     9 Sheets-Sheet 7

INVENTOR
RALPH S. DAMON
BY Bosworth, Sessions,
Herrstrom & Knowles
ATTORNEYS

INVENTOR
RALPH S. DAMON
BY Bosworth, Sessions
Herstrom & Knowles
ATTORNEYS

United States Patent Office 3,267,929
Patented August 23, 1966

3,267,929
HEATING APPARATUS
Ralph S. Damon, Cleveland, Ohio, assignor to Hunter Manufacturing Company, Solon, Ohio, a corporation of Ohio
Filed Feb. 16, 1965, Ser. No. 433,104
13 Claims. (Cl. 126—110)

This invention relates to liquid fuel heaters, and more particularly to liquid fuel heating apparatus in which liquid fuel and air are forced into a combustion chamber associated with a heat exchanger and in which air is forced through the heat exchanger.

A liquid fuel heating apparatus of the above mentioned type is disclosed and described in detail in application, Serial No. 838,157 filed September 4, 1959, now Patent No. 3,173,467. The heating apparatus disclosed in that application includes a combustion chamber with a fuel and air injecting nozzle, an ignition system including igniting electrodes, a fan for forcing air over the heat exchanger and a control system for controlling the combustion in the combustion chamber closely to regulate the temperature of the air delivered from the heat exchanger. The instant invention bears certain similarities to the invention disclosed in the above mentioned application and exhibits certain improvements thereover.

It is a primary object of this invention to provide an improved heating apparatus.

Another object of this invention is to provide a heating apparatus with a single prime mover which can be quickly and easily connected to and disconnected from the apparatus without the use of tools.

Still another object of this invention is to provide an improved heating apparatus which can be operated with either an electric motor or a gasoline engine as the prime mover and in which the heating apparatus and its associated control system can be quickly and easily converted to cooperate with and control the prime mover.

A further object of this invention is to provide a heating apparatus with a combination prime mover and heater assembly including a thermostatic overheat switch positioned in the path of air from the heater assembly controlling the prime mover, which combination can be quickly and easily connected and disconnected.

Still another object of this invention is to provide a heating apparatus with a combustion chamber and heat exchanger which greatly improves the transfer of heat from the combustion chamber to air circulating around and through the heat exchanger and in which the incoming air is heated by the heat exchanger prior to its introduction into the combustion chamber.

A further object of this invention is to provide a temperature control system for a liquid fuel combustion chamber including a burner nozzle supplied with pressurized fuel from a fuel reservoir which accurately controls the combustion chamber temperature by controlling the amount of fuel returned to the fuel reservoir from the burner nozzle.

It is yet a further object of this invention to provide a liquid fuel heating apparatus with an electrical time recorder driven from the electrical source which ignites the fuel to record the heating apparatus elapsed operating time.

It is also another object of this invention to provide a combustion chamber with an axial flow heat exchanger having means at the ends of the heat exchanger for reversing the direction of flow of the combustion products relative to the heat exchanger to achieve maximum heat transfer to the air forced axially through and over the heat exchanger.

Briefly, in accordance with aspects of this invention, a heating apparatus employing a combustion chamber of generally cylindrical configuration is mounted on a frame within an axially aligned, generally cylindrical, annularly sectioned heat exchanger and with a burner in one end-wall of the combustion chamber. The appartus is provided with a fan positioned adjacent the one end of the combustion chamber, which fan forces air over an interior surface of a secondary combustion chamber to preheat the air. This preheated air then flows into the primary combustion chamber to support the combustion of the fuel. Because the air fed to the primary combustion chamber is preheated, frosting of the nozzle is minimized. The fan also forces air axially through concentric annular conduits defining the heat exchanger, the air flowing in an axial direction relative to the primary and secondary combustion chambers to conduct the heat away from the heat exchanger. The combustion chamber includes a pair of concentric cylindrical sections with the inner section acting as a primary combustion chamber and having an opening facing an end-wall of the outer secondary combustion section or chamber. The outer section has discharge openings adjacent its opposite end which communicate through a plurality of crossovers with the heat exchanger. The heat exchanger advantageously includes a series of radially spaced, axially aligned concentric annular conduits providing for plural reversal of flow of the combustion products. Advantageously, the fan is provided with a prime mover, which prime mover is coupled to the fan and the heating control system by coupling arrangements which can be quickly and easily connected and disconnected within a period of one minute without the use of tools. Further, the fan can be driven by either an electrical or an internal combustion prime mover and the heating apparatus control system can be quickly and easily converted to cooperate with either the electrical motor or internal combustion control circuit. If a gasoline engine is employed as the prime mover, the gas is supplied to the prime mover from the same fuel reservoir employed to supply the fuel to the combustion chamber. Further, the exhaust from the gasoline engine prime mover is fed to the interior of the heat exchanger. Thus, a single exhaust stack provides for the exhaust of the combustion products of the gasoline engine and the fuel burner and the heat of the prime mover combustion products is transferred to the air flowing over the heat exchanger.

In accordance with the other aspects of this invention, the prime mover employed to drive the fan also drives the pump which forces the fuel from the fuel reservoir to the nozzle of the combustion chamber. Further, the prime mover drives a magneto which generates electrical energy for a pair of combustion chamber ignition electrodes. An electrically operated clock is connected to the output of the magneto through a rectifying and filtering means such that the clock indicates the elapsed hours of magneto operation, which indication will serve as a maintenance guide for the heating apparatus. The fuel burner includes a control system having a maximum temperature control switch, which control switch is connected in circuit with the magneto circuit of the prime mover. With this arrangement, when the air is delivered from the heat exchanger around the maximum temperature control switch exceeds a predetermined maximum value, the maximum temperature control switch opens the circuit of the prime mover thus completely stopping the prime mover. When the prime mover stops, the pump ceases to supply fuel to the combustion chamber.

In accordance with still other aspects of this invention, the apparatus is provided with a fuel tank, or reservoir, which is connected by the pump to a nozzle mounted on an end-wall of the combustion chamber and directed inwardly along the axis of the combustion chamber, and the nozzle includes a return pipe through which a portion of the fuel is returned to the tank. The portion which is returned to the tank is determined by the pressure in the return pipe, which pressure is regulated by a thermostatically operated "modulating" valve. Advantageously, the modulating valve is operated by a bimetallic element, the exact temperature setting of which may be controlled by a manually rotatable handle and connected cam. The bimetallic element is mounted on a pivoting, cam engaging, spring biased, platform. The combination of cam and opposed spring determines the quiescent, or initial, position of the bimetallic element. The fuel return flow controlling valve is a spring biased valve with a rod extending axially therefrom. This rod passes through a slot in the bimetallic element and the rod supports a bimetallic element engaging shoulder. When the bimetallic element is subjected to increased exhaust air temperature, it bends against the shoulder moving the rod to modify the opening of the modulator valve. Once the predetermined heat exchanger discharge air temperature is selected by the manual handle, the rate of fuel discharged through the constant discharge area nozzle is controlled by the bimetallic element which closely regulates the fuel back pressure on the nozzle. Because the bimetallic element is positioned at the exhaust end of the heat exchanger, the modulator valve opens in proportion to the temperature by passing more or less fuel and thus closely regulates the heat output of the combustion chamber in accordance with the temperature of the air delivered from the heat exchanger.

Other objects and advantages relate to certain novel features of construction, combinations and arrangements of parts as set forth in the following detailed description of a heating apparatus embodying the invention. This description is made in conjunction with the accompanying drawings which form a part of the specification.

In the drawings:

FIG. 3 is a side elevational view from the opposite side relative to the view of FIG. 1, to the same scale as FIG. 1, partly diagrammatic, partly in section, with parts broken away or removed;

FIG. 4 is a view in section, partly broken away, of the structure of FIG. 2 taken along the lines 4—4 of FIG 2, enlarged relative to FIG. 2, and looking in the direction of the arrows;

FIG. 5 is an end elevational view with parts broken away, partly in section, taken along the lines 5—5 of FIG. 4, enlarged relative to FIG. 4, and looking in the direction of the arrows;

FIG. 5A is a perspective view, partly diagrammatic and partly broken away, of a portion of the temperature responsive fuel control system of FIG. 5, to a slightly enlarged scale;

FIG. 5B is a view in section of a modulator valve forming a portion of the fuel control system;

FIG. 6 is a view in elevation, and in section, taken along the lines 6—6 of FIG. 4 showing the heat exchanger with the burner head removed, to a reduced scale as compared to FIG. 4;

FIG. 7 is an end view in elevation, partly broken away and to a reduced scale, of the discharge end of the heating apparatus of FIG. 4;

Figure 1:
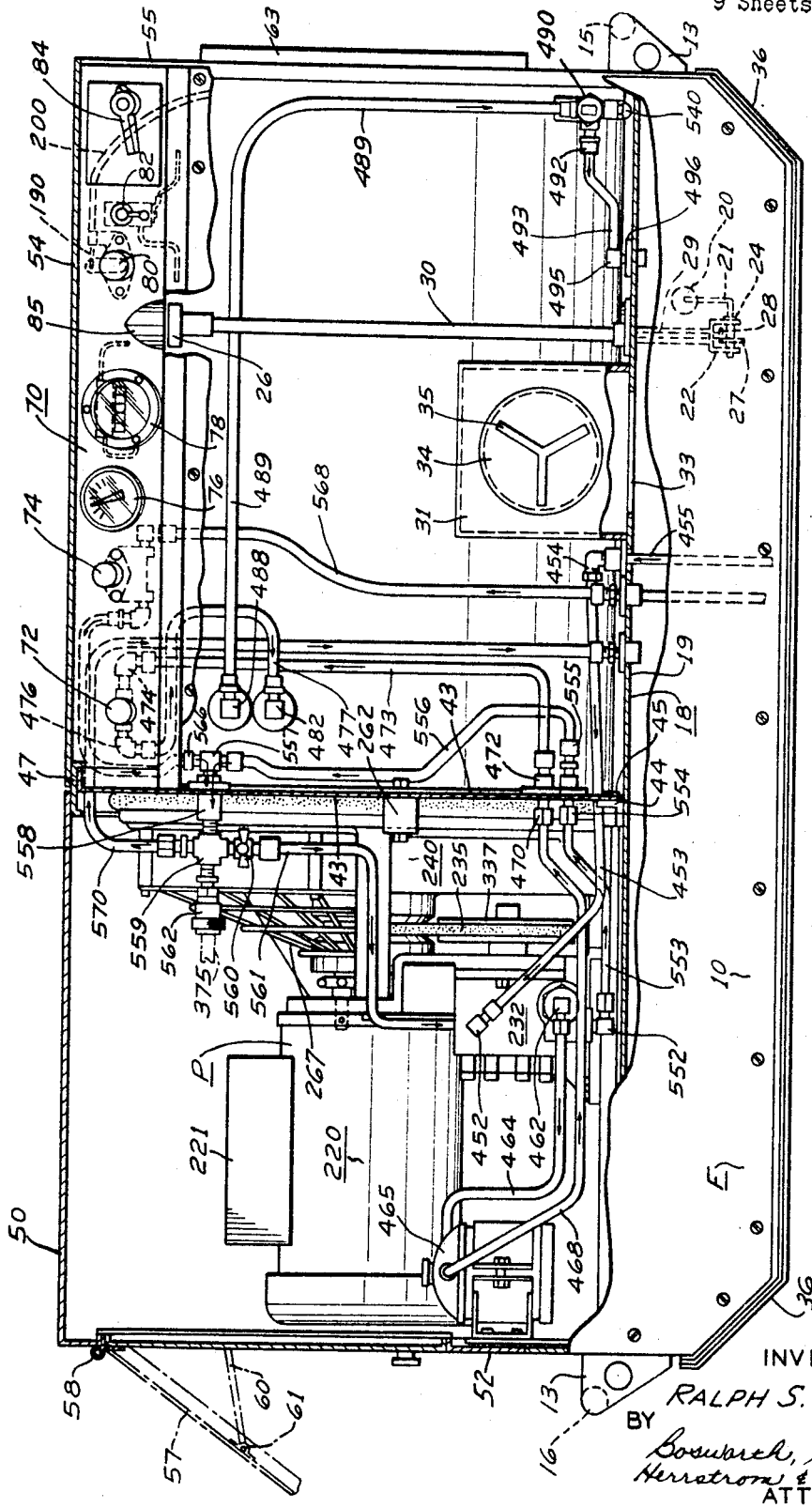
FIG. 1 is a side elevational view, partly diagrammatic, partly in section, with parts broken away or removed, showing the heating apparatus of the present invention.

Referring now to the drawings and specifically to FIGS. 1 thru 4, which are views of one embodiment of heating apparatus according to this invention. The heating apparatus is comprised of a number of subassemblies including a covered frame, F, which frame supports handles for lifting and carrying the heating apparatus and an integral gas tank, or fuel reservoir; a heating unit, H having a combustion chamber with a burner head therein and a heat exchanger encircling the combustion chamber; an electrical control system C having a heater ignition system with a magneto, ignition electrodes and a clock connected to the magneto; a fuel control system including a burner fuel supply system in which the fuel delivered from a fuel nozzle is controlled by controlling the fuel pressure on the downstream or return side of the nozzle in accordance with the temperature of the air leaving the heat exchanger; a prime mover assembly P including an electric motor prime mover and a fan coupled to the prime mover by means of a quick disconnect coupling.

In an alternative embodiment which will be described in conjunction with FIGS. 11 and 12, the prime mover assembly, P includes an alternative prime mover in the form of a gasoline engine which receives fuel from the fuel reservoir and has its ignition system coupled to a temperature responsive switch such that the prime mover is stopped if the temperature of the air from the heat exchanger exceeds a predetermined limit. These subassemblies will now be described under corresponding subheadings.

The covered frame

The covered frame, F includes a generally rectangular box-like base structure with the opposite lower ends having triangular sections removed so that the frame will act as a skid. The opposite sides 10, 11 of the frame F are formed of heavy gauge sheet metal and are each provided with a pair of integral depending ears 13, 14 which support suitable handles 15, 16. The box-like frame F has a suitable fuel reservoir, or tank, 18 formed somewhat integrally with the frame to supply fuel to the burner and to an internal combustion prime mover. The tank 18 includes a top 19 and is provided with a suitable float 20, fastened on the end of a crank arm 21 and pivotally mounted in a U-shaped member 22 by means of a pin 24. The crank arm 21 is connected to a suitable fuel gauge 26 by means of a suitable mechanical linkage including a spur gear 27 secured to the crank arm 21 which meshes with another spur gear 28 on the end of a rod or shaft 29 which extends through a mounting pipe 30 to gauge 26. The tank 18 is provided with a filling conduit 31 which is generally triangular in cross-section and is secured to the top 19 of the tank 18 above a suitable passage 33 by a convenient means, such as by welding. The filling conduit is provided with a filler cap 34 of a well known type which is provided with a Y-shaped raised portion 35 secured to the filler cap 34 to facilitate manual manipulation and rotation of the filler cap.

The base portion of the frame F has a pair of heavy gauge sheet metal runners 36 connected to a bottom plate 37 which reinforces tank 18, as by welding. Runners 36 and plate 37 protect the gas tank 18 against puncture when the heating apparatus is lowered to the ground or is slid along the ground. The frame includes a vertical plate or partition 43 secured to the top of the tank 18 by means of angle irons 44 to which the plate 43 is bolted by a suitable means such as bolt assemblies 45. The frame also includes a channel member 47 which extends vertically along the edge of the plate 43 and horizontally above the plate 43. The plate 43 acts as a partition between the prime mover assembly P and the heater assembly H both of which will be subsequently described in detail. The channel member 47 acts as a support for a cover member 50, the edges of which are secured to the channel member 47 by suitable means such as by bolts 51. The cover member 50 includes an end-wall 52 connected to the end of the frame work base portion by suitable means such as by bolts 51.

The heater assembly

The heater assembly is shown in detail in FIGS. 4 thru 7. FIG. 4 is a view in elevation and in section, partly broken away of the heater assembly H; FIGS. 5 and 6 are sectional views of FIG. 4 taken along the lines 5—5 and 6—6, respectively; and FIG. 7 is an end view taken from the left-hand end of FIG. 4 to a slightly reduced scale and partly broken away.

The heater assembly H is provided with a cover including a top panel 54 and an end-wall 55. The top panel 54 has one end resting on the channel member 47 and secured thereto by suitable means such as by bolts 51. The opposite end of the top panel 54 rests on the end-wall 55 and is secured thereto by suitable means such as by bolts 51. The cover portion 50 is provided with a ventilating lever, or door, 57 which is hinged to the endwall 52 by means of the hinge 58 and the door 57 is provided with a prop, or arm, 60 which is rotatably mounted in a bracket 61 on the door 57 and which engages one of a group of notches, or recesses, not shown, in the end-wall 55 to prop the door in any one of a number of inclined positions.

The end-wall 55 of the cover over the heater unit H is provided with a circular outlet opening 63 which supports a suitable grill work 64, shown in FIGS. 4 and 7, which permits the heated air to be exhausted through the heat exchanger in a manner which will be subsequently described in detail.

As best seen in FIG. 1, an instrument panel 70 is mounted between the vertical partition 43 and the cover end-wall 55 to support the instruments and control knobs necessary to the operation of the heating apparatus. The instrument panel supports a burner shut-off valve handle 72 and a gas motor primer pump including handle 74. To provide a visual indication of the discharge air temperature of the air leaving the heat exchanger, a temperature bulb 75, shown in FIG. 5, is positioned in the path of the outlet air from the heat exchanger and is connected to a discharge air temperature gauge 76 on panel 70 by means of a suitable coupling 77. Panel 70 also supports an elapsed operating time meter 78, an air control handle 80, a prime mover off-on toggle switch 82, and a heat selector handle 84. The fuel gauge 26 is positioned adjacent the instrument panel 70 and is aligned with a recess 85.

The heater assembly includes a main, or primary, combustion chamber 90 which is generally cylindrical in configuration and has a plurality of holes, or air inlet passages 92, spaced circumferentially of the main combustion chamber 90. The main combustion chamber 90 has a burner head 94 formed integrally with the end-wall 95 of the main combustion chamber 90 which burner head is clamped in position by means of a pair of pivotally or hingedly mounted clips 96, 97, shown in FIGS. 3 and 6.

The burner head 94 includes a mounting plate 98 held in spaced relationship relative to the main combustion chamber end-wall 95 by means of a group of spacer members 100. The purpose of the spacial relationship between the mounting head 98 and the end-wall 95 is to permit primary air to enter between the mounting plate 98 and the end-wall 95 as indicated by the arrows 102, 103, 104 and 105. The burner head is provided with a bypass type fuel injecting nozzle 108 to which is connected a fuel control system which will be subsequently described. The liquid fuel injected into the main combustion chamber 90 through the constant cross-sectional discharge area nozzle 108 is ignited by an electrical ignition system including a pair of electrodes 115, 116. Electrode 116 is secured to the burner head 94 and the electrode 115 passes through an aperture 118 in the end-wall 95 and is connected by means of a suitable connector 120 to an electrical cable 121 which is in turn connected to a magneto forming a portion of the prime mover assembly which will be subsequently described.

The cylindrical main combustion chamber 90 is connected by means of a frusto-conical sheet member 125 to a secondary combustion chamber 126 which includes an inwardly facing cylindrical section 127 and a frusto-conical section 128, which in combination with an outer cylindrical member 129 and its end-wall 130, defines a reverse flow path for the combustion products as indicated by the arrows 133, 134. The cylindrical member 129 defining the outer wall of the secondary combustion chamber is connected by means of a plurality of radially spaced crossover conduits or members 140 to a first annular heat exchanger conduit 142. The circumferential spacing of the crossovers 140 connecting the secondary combustion chamber 126 with the annular heat exchanger conduit 142 is best shown in FIG. 6. All of the crossovers 140 have their forward and rearward edges in respective common axially transverse planes. Therefore, all of the products of combustion from the secondary chamber 126 must flow forwardly to these crossovers by flowing in a direction opposite to the flow of combustion products in the main combustion chamber 90. The secondary combustion chamber 126 also contains a gasoline engine exhaust conduit 144 which is connected to the gasoline engine prime mover when such a prime mover is employed so that the combustion products of the gasoline engine will be discharged through the secondary combustion chamber 126. The heat of these combustion products will be transferred through the heat exchanger to the air circulating through, and over, the heat exchanger.

The first annular conduit 142 of the heat exchanger is concentric with the secondary combustion chamber 126 and is radially spaced therefrom by means of crossover 140 to permit the axial flow of air between the conduit 142 and the outer surface 129 of the secondary combustion chamber 126. A second annular conduit 145 is concentric with the first annular conduit 142 of the heat exchanger and is supported in radially spaced relationship to the first annular conduit 142 by a series of crossover members 146 all located in a common transverse region substantially contiguous the plane containing the outlet of the main combustion chamber, such that the combustion products must follow the arrows in serpentine fashion, such as the arrows 133, 134, 147 and 148 passing from the annular conduit 145 into a stack 150 from whence they are discharged to the atmosphere. The second annular conduit, or section, 145 of the heat exchanger is radially spaced from the first annular conduit 142 by means of the crossovers 146 to permit the flow of air over both surfaces of the conduit 145.

The second conduit 145 is supported in axially aligned position relative to a heater assembly cover 160 by means of a pair of generally circular straps 162, 163 which straps have a plurality of circumferentially spaced U-shaped portions 165 which engage, and are secured to, the heating apparatus cover 160 and are also secured such as by welding to the outer surface of the second annular conduit 145 of the heat exchanger. With this arrangement, air may be forced over the outer surface of the second annular heat exchange section 145 as indicated by the arrows 166, 167.

The right hand edge of the cover member 160, as viewed in FIG. 4, engages a generally circular member 170 which is angular in cross-section and is secured thereto by means of a plurality of bolts, such as the bolts 171. The circular member 170 is supported on the partition 43 by suitable means such as by welding. The opposite end of the cover member 160 is supported on a generally circular metallic member 173 which is secured to the end-wall 55 by suitable means such as by welding and the opposite end of the member 173 is secured to the heat baffle member 175 by suitable means such as by bolts 176 which baffle has a plurality of radially tapering air passages 177. The bolts 176 engage a generally circular member 178 which is angular in cross-section and has a plurality of air passages 180 therethrough. These air passages 180 provide a path for the air following the path of arrows 166, 167 and 181 which air is permitted to pass over the end-wall 129 of the secondary combustion chamber 126 and out through the plurality of openings 177, which openings cooperate with a rotatable shutter 185 to control the amount of air delivered from the heat exchanger.

The shutter 185 is rotatably mounted on the end-wall or heat baffle member 175 by means of a suitable pin 186 and carries a plurality of ports or passages 187 which are similar in configuration to and cooperate with openings 177. The relative rotational position of the shutter 185 is controlled by air control knob 80 (FIG. 1) through a flexible cable 190 having shoulder members 191, 192 (FIG. 5) secured to the flexible cable 190 on opposite sides of an angle bracket 194 which is welded, or otherwise secured, to the shutter 185. The flexible cable 190 is enclosed in a suitable sleeve 200 and supported by suitable clamps 202 and extends to the air control handle 80, shown in FIG. 1. Axial movement of the air control handle 80 moves the shutter 185 in a circumferential direction, or otherwise stated, will rotate the shutter 185 about its center pin 186. Because the shutter 185 has a plurality of circumferentially spaced apertures 187, which cooperate with a like plurality of apertures 177 in the heat baffle end-wall 175, rotational movement of the shutter member 185 relative to the heat baffle 175 changes the degree of opening and thus the amount of air permitted to leave the heat exchanger. The second, or outer annular conduit 145, of the heat exchanger is provided with a drain pipe 204 to permit fluid, or liquid combustion products, to be drained from the heat exchanger to thus reduce the possibility of these combustion products from reacting with metal walls of the heat exchanger.

*The prime mover assembly*

Figure 9:
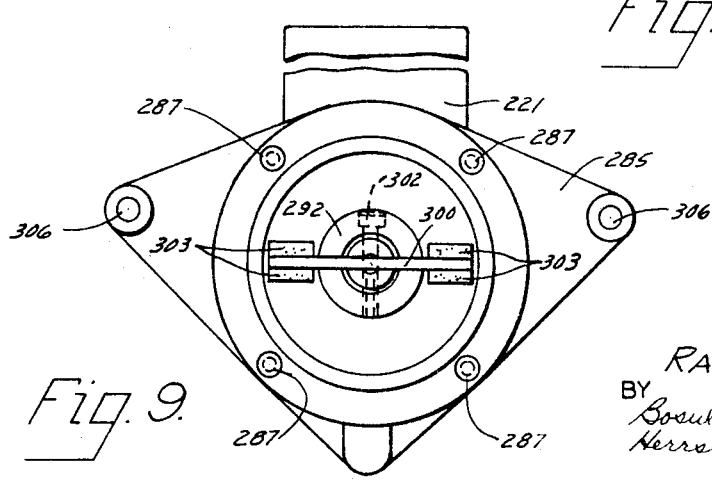
FIG. 9 is an end view of an adapter bracket and coupling for an electric motor prime mover, partly broken away and to the same scale as FIG. 8.
Figure 10:
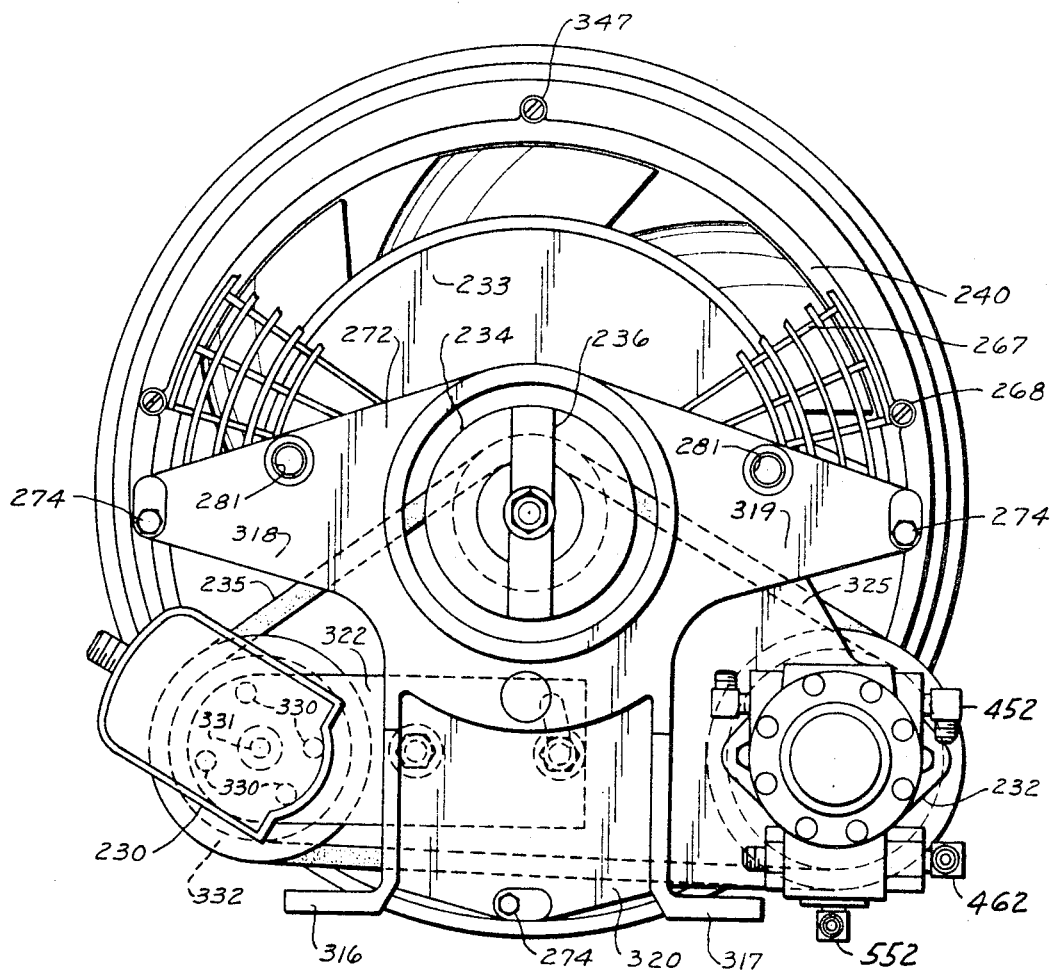
FIG. 10 is an end view in elevation, partly broken away, of the fan, pump and magneto assembly with certain parts removed.
Figure 11:
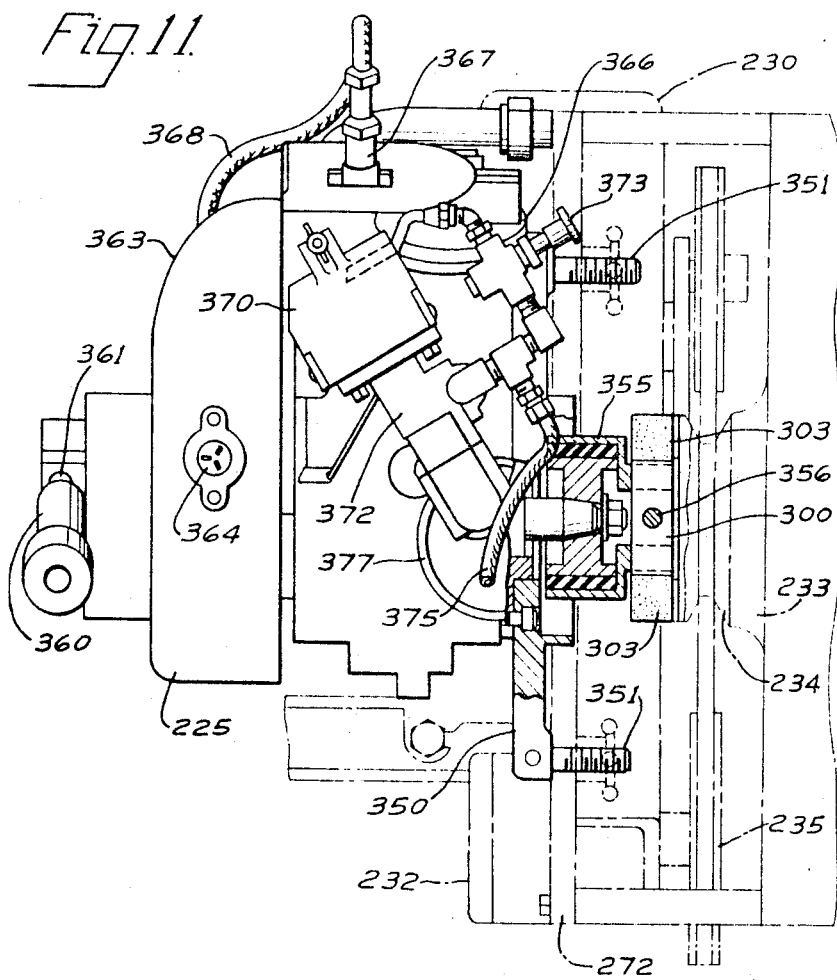
FIG. 11 is a plan view of an internal combustion type prime mover coupled to the fan assembly, to a reduced scale in comparison to FIG. 10 with the other parts shown in phantom.
Figure 12:
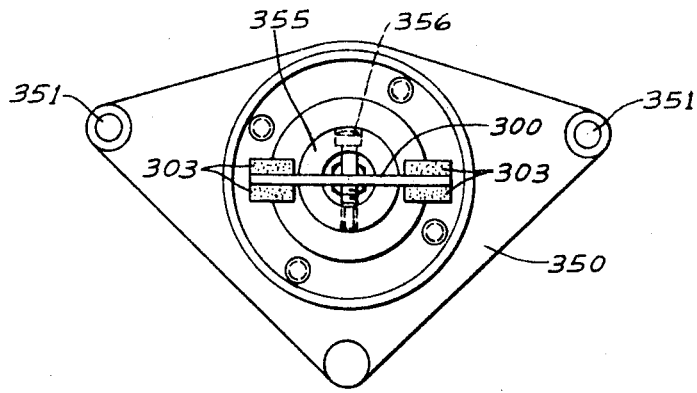
FIG. 12 is an end view of an adapter bracket and coupling for the internal combustion type prime mover.

The prime mover assembly, P is shown in FIGS. 1, 2 and 8 thru 12. FIGS. 1, 2, 8 and 9 show a prime mover assembly employing an electric motor 220 with its associated terminal box 221 and having a line cord 222 depending from the terminal box 221. FIGS. 11 and 12 show elements of a prime mover assembly employing a gasoline engine 225. The prime mover assembly employing either embodiment of prime mover includes a magneto 230 for generating electricity which is delivered to electrodes 115, 116 shown in FIG. 4, to ignite the fuel. The prime mover assembly also includes a fuel pump 232, a fan blade 233, an integral fan pulley 234, the pump magneto pulley being coupled to motor 220 by belt 235. Pulley 234 is provided with a quick disconnect coupling in the form of a diammetrically extending slot 236 which will be subsequently described in detail.

Figure 8:
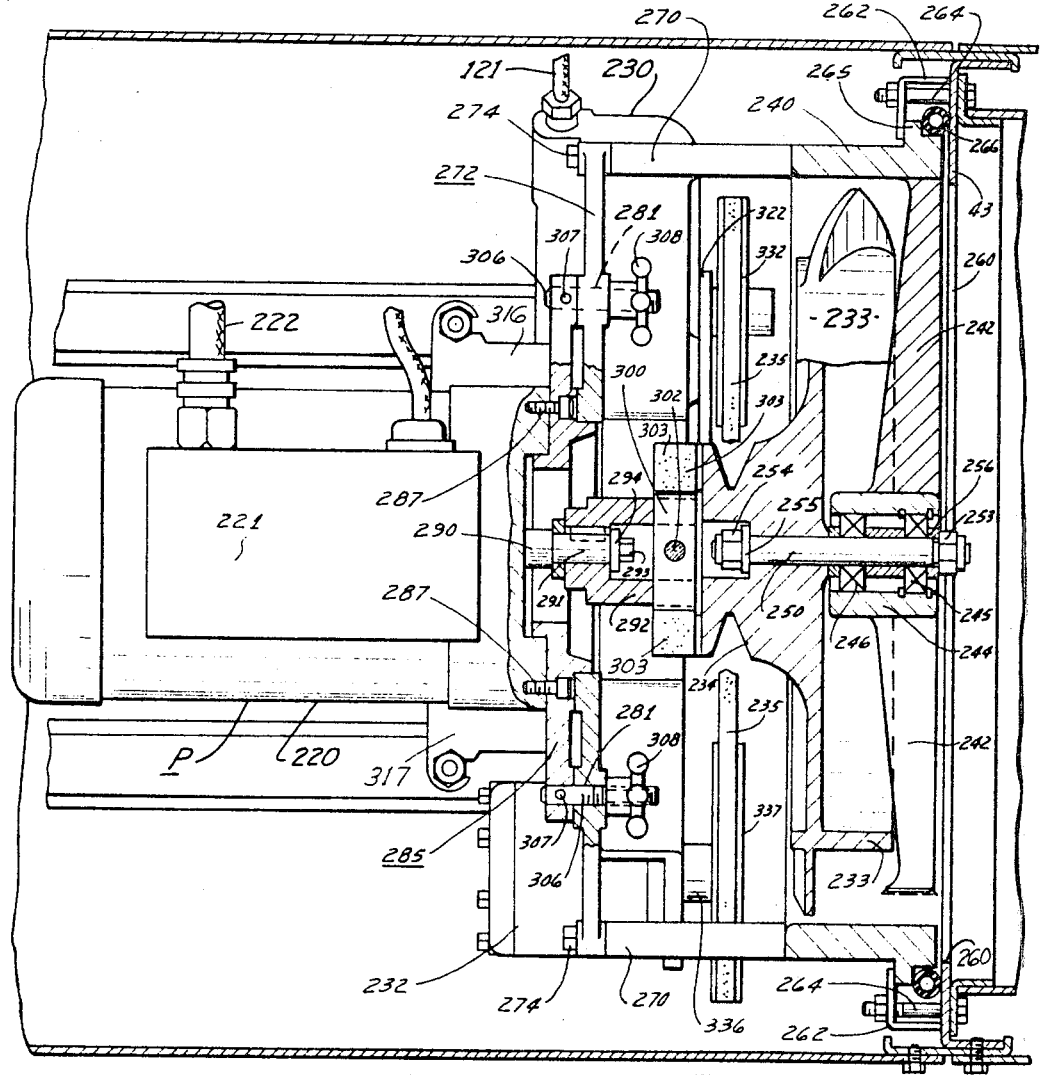
FIG. 8 is a fragmentary plan view, partly in section and partly broken away, of the fan assembly and electric motor prime mover of FIG. 2 to an enlarged scale relative to FIG. 2.

As shown in FIG. 8, the fan 233 is rotatably supported in a fan housing 240 by means of a plurality of radially extending arms 242 which terminate in a hub 244 which supports a plurality of bearings 245, 246. The fan blade 233 is rotatably journalled on a pin 250 extending through the bearings 244, 245 and secured against axial translation relative thereto by means of a pair of nuts 253, 254 and cooperating washers 255, 256. The fan housing is positioned in axial alignment with an aperture 260 in the partition 43 and is supported in this position by a plurality of circumferentially spaced clamps 262 with associated bolt assemblies 264 and the fan housing is provided with a peripherally extending shoulder 265 which holds an O-ring 266 in sealing relationship adjacent the partition 43. The fan is provided with a suitable grill, or guard, 267 held in position to prevent injury to the operator by means of a plurality of fasteners, such as the slotted bolts 268.

The fan housing also includes a plurality of circumferentially spaced, axially extending arms 270. The ends of which are secured to opposite ends of a transversely extending prime mover assembly base plate 272 by means of a plurality of bolts 274 extending longitudinally of the heating apparatus and threadably engaging arms 279. The transverse plate 272 is provided with a pair of apertures 281 on opposite sides of the axis of the fan 233 for the purpose of receiving bolts secured to a prime mover mounting plate 285. In this particular instance, the electric motor 220 is secured to the prime mover mounting plate by a plurality of bolts such as the bolts 287.

The electric motor 220 is provided with an armature (not shown) from which the drive shaft 290 extends, which drive shaft includes a section 291 of reduced diameter which is connected to a coupling sleeve 292 by means of a nut 293 and a washer 294, in a manner well known in the art. A diammetrically extending key 300 is positioned perpendicularly relative to the axis of the drive shaft 290 and engages surfaces on the drive sleeve by means of a diammetrically extending pin 302. FIG. 9 is an end view in elevation of the adapter bracket 285 for the electric motor 220, and the coupling for the electric motor including the transverse key 300. The coupling key is provided with pairs of substantially rectangular resilient members 303 on the opposite faces thereof and adjacent the outer extremity thereof, which resilient members engages the faces of the recesses of the diammetrical slot 236 in pulley 234. A plurality of bolts, such as the bolts 306, are secured to the prime mover mounting plate 285 by suitable means, such as by means of pins 307 and extend through the apertures 281 to receive a manually rotatable handle 308 which threadably engages the bolts 306 to permit the handles 308 to be quickly and easily, manually disconnected relative to the bolts 306 without the use of tools. Because the key 300 can be moved axially relative to the diammetrical slot 236 in the fan pulley 234, the prime mover electric motor 220 may be quickly and easily disconnected from the pulley 234.

Figure 2:
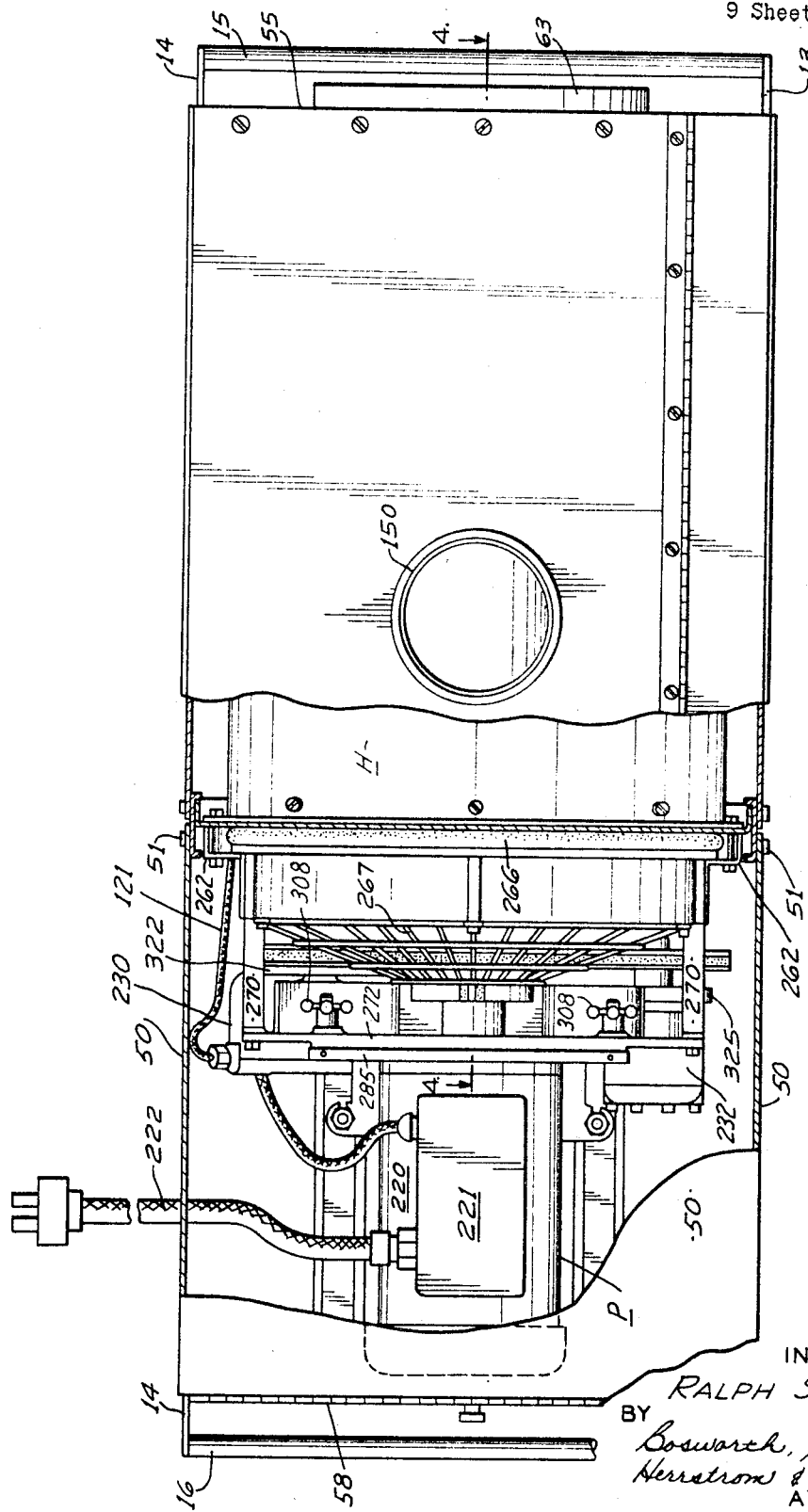
FIG. 2 is a plan view, partly in section, of the embodiment of FIG. 1, to a slightly enlarged scale with parts broken away or removed.

The prime mover assembly base plate 272 may be formed as a casting and has oppositely extending foot portions 316, 317 (FIG. 10) and a pair of oppositely extending arm portions 318, 319 the opposite ends of which are connected to the fan housing arms 270 by the previously mentioned bolts 274. Foot portions 316, 317 are connected by a web portion 320 through which a bolt 274 extends and engages a fan housing arm 270 (not shown). The base plate 272 supports a belt tensioning arm 322 which supports the magneto 230 and an oppositely extending flange portion, or web, 325 which supports the fuel pump 232, which structure is shown in FIGS. 2, 8 and 10.

The magneto 230 is supported on the depending flange 322 by means of a plurality of bolts, such as the bolts 330 which extend through the flange 322 and engage the magneto housing. The magneto has a drive shaft 331 which supports a suitable pulley 332 which pulley engages and is driven by the belt 235. The pump 232 includes an axially extending shaft 336 which supports a suitable pulley 337 which engages the belt 235 in driven relationship. Because the pulley 234 is formed integrally with the fan 233, and because this pulley is mechanically linked to the pulleys 332, 337 of the magneto and fuel pump, respectively, the single electric prime motor 220 coupled by means of the quick disconnect key 300 drives the entire prime mover assembly through the resilient pads 303.

In an alternative embodiment, the prime mover assembly includes an internal combustion engine such as the gasoline motor 225 shown in FIG. 11, which may be coupled to the pulley 234 of the fan 233 by means of key 300 which is shown in elevation in FIG. 12. An adapter bracket 350, similar in shape and size to the adapter bracket 285 of FIG. 9, is employed to mount the gas engine prime mover 225 on base plate 272. The adapter bracket 350 has a pair of bolts 351 mounted on the outer extremities thereof and perpendicular to the major dimension of the bracket 350 for engaging the prime mover assembly base plate 272. The coupling shown in FIG. 12 includes a transverse blade member 300 and associated resilient members 303 identical to those shown in FIG. 9 which is employed with the electric drive arm mover. The key 300 is mounted transversely in a coupling member or sleeve 355 and secured in this position by means of a key or pin 356.

The particular gasoline engine employed is of the type well known in the art which is started by a pull-rope type starter having a handle 360 connected to a pull-rope 361. The motor includes a magneto housing 363 provided with an electrical receptacle 364 connected in the ignition circuit in a manner which will be subsequently described. This electrical circuit provides for cutoff of the ignition of the gasoline motor if the air delivered from the heater apparatus exceeds a predetermined temperature. The motor 225 is provided with a cylinder 366 on which is mounted a sparkplug 367. The sparkplug is connected to the magneto housing 363 through a suitable shielded cable 368. The motor is provided with a carburetor preheater 370, a carburetor 372 and a valve 373 connected in the line to the pre-heater from the carburetor inlet pipe, or hose, 375. The motor 225 is also provided with an air filter 377 to filter the air supplied to the cylinder 366 in a manner well known in the art.

*The electrical control system*

Figure 13:
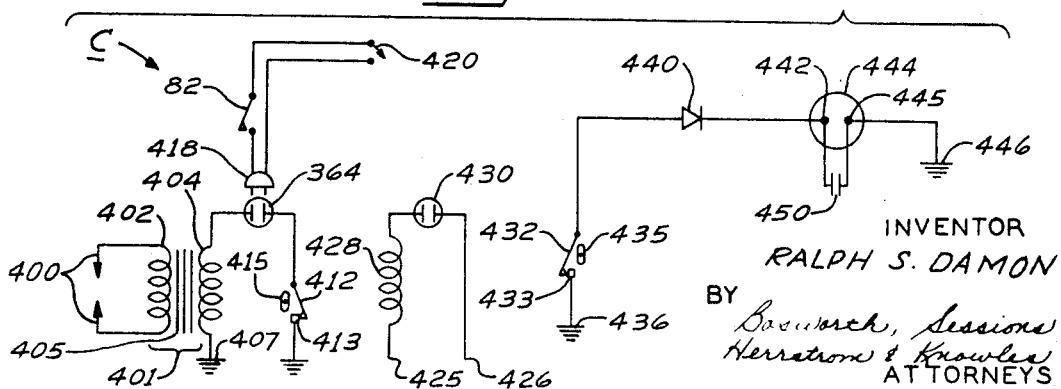
FIG. 13 is a combine pictorial and schematic representation of the electrical system of the heating apparatus.

The electrical control system includes the heater ignition system and associated electrical circuitry shown in combined schematic and pictorial form in FIG. 13. The spark gap electrodes 400 are a portion of the sparkplug 367 shown pictorially in FIG. 11. The spark gap electrodes 400 of sparkplug 367 are connected to a secondary winding 402 of an engine magneto 401 and the primary winding 404 is magnetically coupled to the secondary winding 402 and this coupling is aided by a magnetic core 405. One terminal of the primary winding 404 is connected to ground as indicated at 407 and the other terminal is connected to one terminal of outlet plug 364. The other terminal of the outlet plug 364 is connected through a pair of breaker contacts 412, 413 to ground. A breaker cam 415 is associated with the breaker contact 412 to periodically interrupt the primary circuit of the magneto in a manner well known in the art. The plug 364 is a female type plug which is adapted to receive a male type plug 418 of the type well known in the art. The male type plug 418 has one terminal connected to single pole, single throw prime mover controlling toggle switch 82, shown pictorially in FIG. 1. Also serially connected in the circuit of the plug 418 is a bimetallic normally closed thermostatic overheat switch 420 which is shown pictorially in FIG. 5, as being mounted centrally of the rear wall or heat baffle plate 175, and also rearwardly of the rotatably mounted shutter 185.

Preferably, this thermostatic switch is of the manual reset type and is set to open at some predetermined maximum temperature such as 350° F. corresponding to a safe temperature for delivering heated air. When the air forced over the switch 420 reaches this predetermined maximum temperature, the overheat switch opens thereby opening the primary circuit of the engine magneto and terminating the delivery of the electrical energy to the spark gap within the gasoline engine. Thus, the gasoline engine will stop and because it acts as the prime mover for the combustion chamber fuel pump 232 and the magneto 230 for supplying electrical energy to the combustion chamber electrodes 115, 116 shown in FIG. 4, the operation of the entire heating apparatus is terminated. After the thermostatic overheat switch 420 cools to a sufficient temperature to close its contacts, the engine may be restarted by pulling upon the starting rope handle 360 in a manner well known in the art.

If the electric motor 220 is employed as the prime mover, the thermostatic switch 420 and its serially connected toggle switch 82 are serially connected in the series circuit supplying energy to the prime mover 220 from its associated source of electrical power. Thus, the thermostatic switch 420 will interrupt the operation of the heating apparatus regardless of which type of prime mover is employed. The arrangement for the energizing circuit of the electric motor 220 is shown as including a pair of power input terminals 425, 426 with terminal 425 connected to the field winding 428 of the motor 220. It is assumed that this is a squirrel cage type motor, such that there is no direct energization of the armature. The opposite terminal of the field winding 428 is connected to a suitable female terminal 430 to which the plug 418 may be connected when the electric motor 220 is substituted for the gasoline engine 225.

The control system further includes a circuit for indicating the elapsed time of operation of the heating apparatus, which circuit includes the breaker points 432, 433 of the magneto 230, which breaker points are operatively associated with the magneto breaker cam 435. The contact 433 is connected to ground as indicated at 436 and the contact 432 is connected through a half-wave rectifier 440 to a terminal 442 of an electric clock 444. The other terminal 445 of electric clock 444 is connected to ground as indicated at 446. A suitable capacitor 450 is connected across the terminals 442, 445 of the electric clock 444 to filter the pulses of uni-directional electrical energy fed from the magneto breaker contacts 433, 432 through the half-wave rectifier 440. Thus, the clock 444 will indicate the period of operation of the heater magneto and because of its mechanical linkage to the prime mover will indicate the elapsed operating time of the entire heating apparatus. This elapsed time can serve as an index for periodic maintenance of the heating apparatus.

*The fuel control system*

The details of the fuel control system are shown in FIGS. 1, 5, 5A and 5B. As shown in FIG. 1, the prime moving electric motor 220 drives the belt 235, which is coupled in driving relationship to the pulley 337 on the pump 232. The pump 232 has an inlet nipple 452 which is coupled to the fuel supply reservoir 18 by means of a pipe 453 connected to an elbow 454 and the short section of the pipe 455 within the tank 18. The pump has a first outlet nipple 462 which is connected through a suitable conduit, or pipe, 464 to a suitable fuel filter 465. The outlet side of fuel filter 465 is coupled through a pipe 468 to a threaded connector 470 mounted on the partition 43. On the opposite side of the partition 43 from the connector 470 is a communicating connector 472 which is connected by means of a pipe 473 and an elbow 474 to the burner manual shut-off valve 72. As mentioned previously, the burner shut-off valve 72 is mounted on the instrument panel 70 for the purpose of manually controlling the supply of fuel to the burner. The outlet side of the burner shut-off valve 72 is connected through an elbow 476 and a pipe 477 to a coupling 482 mounted on the heat exchanger cover 160 which communicates with the injector nozzle 108 shown in FIG. 4 through a pipe 483. The connectors to nozzle 108 include an inlet nipple 484, a by-pass type coupling 485 and an outlet elbow fitting 486 which is connected to the return flow pipe 487. As shown in FIG. 4, a pipe 487 is coupled to a fitting or coupling 488 mounted in the heat exchanger cover 160, which is connected through pipe 489 to a modulator valve 490 (FIGS. 1, 5 and 5B) which is thermostatically controlled in a manner which will be subsequently described. The modulator valve 490 is connected through a threaded fitting 492 to a pipe 493 which is connected to a suitable elbow 495 secured in the top 19 of the tank 18, by a suitably threaded sleeve 496.

During the operation of the heating apparatus, the operation of the prime mover 220 drives the pump 232 which in turn pumps fuel from tank 18 through the filter 465 through the burner shut-off valve 72 to the bypass fitting 488 connected to nozzle 108. This fluid fuel is supplied to the burner under pressure of the order of 150 pounds per square inch. The amount of this fuel which passes through the nozzle 108 is determined by the back pressure in the fluid being returned to the tank through the return pipe 487 and the modulator valve 490. Thus, by controlling the amount of restriction provided by the modulator valve 490 or the amount of resistance to the fluid flow in the fluid being returned to the tank, it is possible accurately to control the amount of fuel delivered to the burner. The modulator valve 490 is closely controlled in accordance with the temperature of the air delivered from the heat exchanger in a manner which will be described.

The manual control heat selector knob 84, shown on the instrument panel 70, in FIGS. 1 and 5 is secured to a shaft 497 which is rotatably mounted in the panel by means of a suitable bearing member 500. The shaft 497 extends through the heat exchanger cover 160 downstream from the rotatable shutter member 185 and supports a cam 502. The cam 502 is secured to the shaft 497 by means of a suitable threaded pin 503, which frictionally engages the shaft 497. A platform 505, shown in perspective in FIG. 5A and in elevation in FIG. 5, is pivotally mounted on a suitable pivot pin 507, which pivot pin extends through end-wall 55 and has threads (not shown) to which is secured a nut, also not shown. A pair of opposed side members 508, 509 are mounted on pin 507 and act as guides for the platform 505. The platform 505 is provided with an end member 510 which has a slot therein to receive the rod 497. A small eyebolt 512 has its eye encircling the rod 497 and its bolt portion extends through a hole 513 in the platform 505. The bolt portion of the eyebolt 512 supports a helical spring 515 between a pair of washers 516, 517 the outer washer 516 being held in position by a threaded nut 518 which threadably engages the bolt 513. The platform includes a transverse right angle portion 520 having a slot 521 therein which is elongated longitudinally of portion 520, and receives the end of the rod 497. Rotation of the rod 497 about its axis causes the cam 502 to rotate against the platform 505 and control the spacial relationship or the distance between the right hand end of platform 505 and the rod 497. A bimetallic member 522 is mounted on this end of the platform 505 by suitable means such as a pair of threaded fasteners 523 and the bimetallic element 522 is provided with a shoulder element 528 positioned in the path of bimetalic element 522.

When the temperature of the air leaving the heat exchanger through the apertures 187 in the sliding baffle plate 185 exceeds a predetermined value for which the bimetallic member 522 is set, the bimetallic element bends in a direction indicated by the arrow 529 and applies an axial force on the rod 527 thereby opening or increasing the opening of the bypass modulating valve 490 in a manner which will now be described in detail.

Referring now to FIG. 5B, there is depicted a view, partly in section, of the modulator valve 490. The modulator valve 490 includes a body portion 530 having an inlet conduit section 531 and an outlet conduit section 532. The body 530 is provided with an annular end cap 533 which slidably receives the end of rod 527. The opposite end of the valve 490 from the cap 533 is inclosed by a suitable threaded cap 534. The rod 527 engages the center of a floating circular thrust plate 535, the outer edges of which engage diammetrically opposed thrust pins 536. Thrust pins 536 are slidably mounted in suitable passages for longitudinal movement relative to the body 530. The opposite ends of the thrust pins 536 from the plate 535 engage a circular flange 537 of a floating sleeve 538. The opposite side of the circular flange 537 from the thrust pins 536 is engaged by a helical spring 539. The opposite end of the spring 539 from the circular flange 537 rests against a spring plate 540. The spring plate 540 is free to move in the central bore of the valve body 530 and rests on the pointed end of a spring tension adjusting rod 541. The spring tension adjusting rod 541 is threaded at 542 to threadably engage a sleeve 543 which threadably engages the valve body 530. A smaller threaded sleeve 544 encircles rod 541 and threadably engages the sleeve 543. The end of sleeve 544 compresses a fluid seal 545 against a washer 546 and a shoulder of sleeve 543 to define a suitable fluid seal around the rod 541.

The floating sleeve 538 carries a pointed pin 547 which cooperates with a nozzle 548 axially aligned with pin 547 in the body 530 to control the amount of fluid flowing from the inlet portion 531 to the outlet portion 532. The pin 548 is slidably mounted within the sleeve 538 and is spring biased by a suitable helical spring 549 which mounting aids the centering of the pin 547 relative to the nozzle 548. The helical spring 549 has a relatively small circular section which engages a shoulder 550 on the flow controlling pin 547 and a relatively large end which engages the end wall of the floating sleeve 538. The floating sleeve 538 is provided with apertures 551 which permit fuel to feed through the sleeve 538 and the fuel is also permitted to pass around the thrust pins 536 adjacent the circular flange 537 when the pin 547 is held in a position remote from the nozzle 548.

The amount of fuel flowing through the modulator valve 490 is determined by opposed axially directed forces. The first axially directed force is transmitted from the bimetallic element 522 (FIGS. 5 and 5A) by thrust rod 527, through plate 535 and thrust pins 536 to floating sleeve 538. The opposing axially directed force is provided by the helical spring 539. The magnitude of this latter force is determined by tension adjusting rod 541 acting through the spring plate 540. With the spring tension adjusting rod 541 retracted, spring plate 540 rests against the shoulder in sleeve 543. The compression of spring 539 is sufficient to hold valve pin 547 in fluid sealing relationship in nozzle 548 against a fuel pressure of 150 pounds per square inch measured at the outlet of pump 232 with the rod 527 in position, as shown in FIG. 5 and with the bimetallic element 522 applying no pressure to shoulder element 528. During operation, the temperature of the air over the bimetallic element 522 causes the bimetallic element to bend and press on the thrust rod 527. This force opens the valve 490 by moving the floating sleeve 538 downwardly as viewed in FIG. 5B, thus unseating the pin 547. Thus, the degree of opening of valve 490 is proportional to the pressure of element 522. This movement of the pin 547 effectively decreases the back pressure on the fluid delivered through the modulator valve and thus decreases the back pressure of the fluid on the nozzle 108 in the main combustion chamber. When the back pressure of the fuel at the nozzle 108 decreases, less fuel is forced through the nozzle and the rate of heat production in the combustion chamber is decreased. By employing bimetallic element, which is adjustably positioned relative to the valve thrust rod 527 and by balancing the thrust of the bimetallic element and the liquid fuel pressure against the helical spring 539, the apparatus is capable of closely controlling the temperature of the air delivered from the heat exchanger over a wide temperature range. For example, the fuel supply control system is capable of controlling the temperature of air within plus or minus ten degrees over an ambient temperature range of −65° to at least +70° and provide this close control of air outlet temperature for manually selected temperatures in the range of from 150° F. to 280° F. Priorly, in order to achieve control of this degree over these ranges of temperatures, it has been necessary to employ two parallel controls, each controlling the fuel in accordance with separate conditions. One of these controls was directed to controlling the fuel flow in accordance with the ambient temperature, while the other of these controls constituted the adjustment for various temperature ranges.

When the gasoline engine 225 is employed as the prime mover, the fuel supply system for the fuel burner is also coupled to supply fuel to the gasoline engine 225. The pump 232 has a second outlet nipple 552 (FIG. 1) through which the pump delivers fuel to the gasoline engine 225. This fuel flows through a pipe 553, a pair of couplings 554, 555 and a pipe 556 to a T coupling 557. The T coupling 557 threadably engages a coupling 558 mounted in the partition 43. The opposite end of the coupling 558 is connected to an X coupling 559. Beneath the X coupling 559 is a manually controllable valve 560 connected through a pipe 516 to one of the pump inlets, not shown. A coupling 562 extends horizontally to the left out of the coupling 559 as viewed in FIG. 1 and is a quick disconnect coupling which may be manually quickly and easily coupled to and disconnected from flexible hose 375, shown in fanthom lines in FIG. 1 and shown broken away in FIG. 11. As previously mentioned, hose 375 communicates with the carburetor 372 of the internal combustion engine 225 and a manually operable valve 373 connected to the carburetor preheater 370. A pipe 556 is coupled to the T coupling 557 and extends vertically therefrom and is connected to the primer pump 74. The opposite side of the primer pump 74 is connected to the fuel tank 18 by means of a suitable pipe 568. A pipe 570 extends vertically from coupling 559 through the partition 43 and returns to the tank 18 to discharge any excess fuel not delivered through the quick disconnect coupling 562 or the manually operable valve 560. In starting the apparatus, it may be necessary to prime the fuel pump 232 and this is accomplished by opening the manually operable valve 560 to permit a portion of the fuel delivered from the priming pump 74 to the fuel pump 232 to obtain suitable suction. After the priming is completed, valve 560 is closed. When operating the heating apparatus with the gasoline prime mover it may be necessary to prime the gas engine. This is accomplished by connecting the carburetor inlet tube 375 to the quick disconnect coupling 562 and operating the manually operable primer pump 74. After sufficient fuel is delivered to the carburetor 372, the operation of the primer pump 74 may be terminated.

When starting the internal combustion engine 225 in very cold ambient air, it may be necessary to preheat the fuel. This is accomplished by opening the manually operable valve 373 and delivering fuel to the carburetor preheater 370, closing the valve 373 and lighting the preheater wick, not shown. When engine 225 is employed as the prime mover, the engine exhaust, not shown, is coupled through a pipe 572, a flexible coupling 573 and a pipe 575, all shown in FIG. 3, to the engine exhaust 144, shown in FIG. 4. When the electric motor 220 is employed, pipe 572 is closed by a threaded cap, not shown, to prevent the escape of combustion products from the secondary combustion chamber 126.

In accordance with the provisions of the patent statutes, the principle of operation of the invention has been described together with the apparatus now believed to represent the best embodiment thereof, but it is to be understood that the apparatus shown and described is only illustrative and that the invention may be carried out by other arrangements.

What I claim is:

1. In a heating apparatus including a heat exchanger for heating air and a fuel burner for supplying heat to the exchanger, said burner being of the type having means defining a combustion chamber and nozzle means adapted to project fuel into the combustion chamber, a fuel system comprising:
    pump means for supplying fuel under pressure to said nozzle means;
    a fuel reservoir coupled to said pump means;
    return flow means coupled between said nozzle and said reservoir to return a portion of the fuel from said nozzle to said reservoir;
    modulator valve means coupled in said return flow means for controlling the back pressure in said return flow means and thereby control the fuel returned to said reservoir, said modulator valve means including a pressure responsive valve biased to open position by said back pressure and an adjustable means for biasing said valve to a closed position, and temperature responsive means positioned in the path of the heated air from said heat exchanger and coupled to said valve for opposing said biasing means.

2. The combination according to claim 1 wherein said temperature responsive means includes a bimetallic element supported adjacent said heat exchanger and mechanically coupled to said valve.

3. The combination according to claim 1 wherein said temperature responsive means includes a bimetallic element mounted on a platform and means pivotally mounting said platform adjacent said heat exchanger, spring biasing means engaging said platform and cam means for moving said platform against said spring biasing means to control the initial position of said bimetallic element.

4. The combination according to claim 3 wherein said bimetallic element is coupled to said modulator valve means by means of a rod and a bearing member on said rod positioned to be engaged by said bimetallic element and wherein said valve means includes a valve orifice, said valve including a tapered pin seated in said orifice for axial movement relative thereto, and an inlet fitting including a fluid passage communicating with said orifice for receiving pressurized fuel upstream relative to said orifice whereby the pressure of said fuel acts against said tapered pin in a direction to unseat said pin by overcoming said biasing means.

5. The combination according to claim 4 wherein said bimetallic element has an aperture therein, said rod extending through said aperture and wherein said cam means includes a manually operable handle for selecting the temperature range of said heat exchanger by changing the position of said platform and said bimetallic element relative to said bearing member.

6. The combination according to claim 5 wherein said heat exchanger includes a plurality of coaxial, substantially hollow cylindrical sections and includes annular passages between said sections for the flow of air and wherein said apparatus includes means for forcing air through said passages, said bimetallic element being positioned adjacent one end of said sections.

7. In a heating apparatus having means defining an elongated primary combustion chamber of generally circular section, a secondary combustion chamber having a sidewall portion facing said primary combustion chamber, and nozzle means disposed at one end of the primary combustion chamber and adapted to project fuel into the primary chamber to burn in said chambers, the combination comprising:
    fan means positioned adjacent said one end of said primary combustion chamber and communicating with the interior of said primary combustion chamber for supplying air thereto by forcing air against said sidewall portion to preheat said air prior to forcing said air into said primary combustion chamber, said fan communicating with the exterior of said secondary combustion chamber for directing air around the secondary chamber to be heated;

fuel supply means coupled to said nozzle for supplying fuel under pressure to said nozzle;

fuel reservoir means;

fuel conduit means coupled to said nozzle and to said reservoir means for returning fuel to said reservoir means;

fluid pressure responsive modulator valve means coupled to said fuel conduit means and including a pressure responsive valve member biased to open position by the back pressure of said fuel, and biasing means for opposing the fluid pressure acting upon said valve member; and temperature responsive control means for acting upon said valve member in opposition to said biasing means for controlling the amount of fluid returned to said fuel reservoir means.

8. The combination according to claim 7 wherein said temperature responsive control means includes a bimetallic element and means for controlling the effective temperature range of said bimetallic element.

9. The combination according to claim 7 including a prime mover and a detachable coupling, linking said prime mover to said fan means, said prime mover including a drive shaft having a coupling blade extending transversely therethrough, said blade having pairs of resilient members on opposite ends thereof, said fan means including a rotating blade having a diammetrical slot therein adapted to receive said coupling blade and engage said resilient members whereby said prime mover drives said fan blade through said coupling blade and said resilient members.

10. The combination according to claim 9 including a frame supporting fan means, a prime mover mounting plate coupled to said frame and an adapter bracket including fastening means for engaging said plate and locking means for engaging said fastening means.

11. The combination according to claim 10 wherein said prime mover is an electrical motor and wherein said fuel burner ignition system includes a magneto coupled in driven relationship to said prime mover, sail fuel supply means including a fuel pump coupled to said prime mover in driven relationship, an overheat switch positioned adjacent said heat exchanger and serially connected to said electric motor for simultaneously interrupting the operation of said motor and said fuel pump when the air surrounding the overheat switch exceeds a predetermined temperature.

12. The combination according to claim 7 wherein said prime mover is an internal combustion engine including fuel intake means coupled to said nozzle fuel supply means.

13. The combination according to claim 12 wherein said internal combustion engine includes an electrical ignition circuit and wherein said fuel burner includes a thermostatic maximum temperature controlling switch positioned adjacent said heat exchanger and coupled to said electrical ignition circuit for opening said circuit when the temperature of the air surrounding said maximum temperature switch exceeds a predetermined value.

References Cited by the Examiner
UNITED STATES PATENTS

| | | | |
|---|---|---|---|
| 2,254,481 | 9/1941 | Harris | 236—10 |
| 2,448,595 | 9/1948 | Holbrook | 126—116 |
| 2,494,079 | 1/1950 | Andrews | 236—101 |
| 2,547,040 | 4/1951 | Perle | 158—1 |
| 2,588,350 | 3/1952 | Budlane | 236—11 |
| 2,990,117 | 6/1961 | Robson | 236—10 |
| 3,076,604 | 2/1963 | Robson | 236—10 |
| 3,156,290 | 11/1964 | Goodall et al. | 158—36.3 |

JAMES W. WESTHAVER, *Primary Examiner*.